United States Patent [19]

Gregg

[11] Patent Number: 4,519,733
[45] Date of Patent: May 28, 1985

[54] METHOD AND APPARATUS FOR AUTOMATICALLY EXCHANGING A WORKPIECE IN A MACHINE TOOL

[75] Inventor: Hans Gregg, Steinebach, Fed. Rep. of Germany

[73] Assignee: Carl Hurth Maschinen- und Zahnradfabrik GmbH & Co., Munich, Fed. Rep. of Germany

[21] Appl. No.: 405,006

[22] Filed: Aug. 4, 1982

[30] Foreign Application Priority Data

Aug. 5, 1981 [DE] Fed. Rep. of Germany ....... 3131016

[51] Int. Cl.³ .................. B23F 19/06; B23F 23/04
[52] U.S. Cl. ............................... 409/7; 198/696; 414/750; 414/753; 414/786; 51/215 AR; 409/37; 409/49; 409/51
[58] Field of Search ............ 409/6, 7, 37, 49, 51; 51/215 AR, 215 CP; 414/225, 750, 753, 786; 198/696, 617

[56] References Cited

U.S. PATENT DOCUMENTS

| | | | |
|---|---|---|---|
| 2,733,641 | 2/1956 | Praeg | 409/7 |
| 2,736,238 | 2/1956 | Montcrieff | 409/6 |
| 3,110,224 | 11/1963 | Davis | 409/6 |
| 4,106,632 | 8/1978 | Bossi | 409/37 X |
| 4,189,279 | 2/1980 | Anderson | 409/6 X |
| 4,312,618 | 1/1982 | Greene | 414/225 |

Primary Examiner—Z. R. Bilinsky
Attorney, Agent, or Firm—Flynn, Thiel, Boutell & Tanis

[57] ABSTRACT

A sliding member having two gripping devices removes a finished workpiece from a machine and at the same time introduces a blank workpiece. The sliding member carries out a rectilinear feed and return movement, for which it is hydraulically driven. All movements of the two gripping device systems are controlled by cams, including (1) opening and closing the finished part gripping device when picking up the finished part, (2) swivelling the finished part gripping device approximately 90°, (3) opening and closing the blank gripping device as the sliding member is returned, (4) again erecting the finished part gripping device when outside of the machine, and (5) stabilizing the blank and finished part gripping devices during movement of the sliding member. To this must be added, if the workpiece is a gear which is to engage a gearlike tool, determining when the workpiece and tool have not meshed and then effecting a repetition of the approach while securely maintaining the blank workpiece in the blank gripping device.

14 Claims, 19 Drawing Figures

METHOD AND APPARATUS FOR AUTOMATICALLY EXCHANGING A WORKPIECE IN A MACHINE TOOL

FIELD OF THE INVENTION

This invention relates to a method and apparatus for automatically exchanging a workpiece in a machine tool.

BACKGROUND OF THE INVENTION

In all areas of manufacturing, there is a desire for automation. With this, the demand for automatic workpiece exchange exists very strongly. The known mechanisms in which the machined workpiece is removed from the clamping or working position in the machine with a swingable gripping mechanism and another simultaneously swingable gripping mechanism moves a new blank workpiece into the working position, cannot be used in all machines because the requisite space for such swingable gripping mechanisms is not always available. The use of pallet magazines where feed and discharge of workpieces occurs from one side of the machine, through the clamping or working position, to the other side of the machine often cannot be used, due to an existing workpiece transport system being provided on only one side of the machine.

Therefore, a basic purpose of the invention is to develop a method and an apparatus with which blank workpieces which have been moved to a first side of the machine with any desired transport mechanism can be moved to the working position and the machined workpieces can be moved in the opposite direction to a mechanism for effecting further transport, which mechanism is also on the first side of the machine. The drive arrangement needed for the various feed, return and gripping movements is to be kept to a minimum.

SUMMARY OF THE INVENTION

The foregoing and other purposes are attained by providing a method and apparatus in which a carriage is supported for movement between the working position and loading and unloading positions. First and second gripping mechanisms are movably supported on the carriage, the first gripping mechanism carrying finished workpieces from the working position to the unloading position and the second gripping mechanism carrying blank workpieces from the loading position to the working position. A blank workpiece is loaded into the second gripping mechanism at the loading position and the carriage then moves to the working position. The first gripping mechanism reaches the working position before the second gripping mechanism and picks up from a support mechanism the finished workpiece which has just been machined at the working position. As the carriage completes its movement, the second gripping mechanism reaches the working position and the blank workpiece is transferred to the support mechanism there. The carriage then begins a return movement to the loading and unloading positions, the first gripping mechanism having been moved to an orientation in which it can pass the working position without interfering with the blank workpiece now supported there. As the carriage moves back to its original position, the first gripping mechanism is returned to its original position on the carriage. When the carriage has reached its original position, the finished workpiece is removed from the first gripping mechanism. Another blank workpiece is then transferred to the second gripping mechanism, and the sequence just described repeats.

In a preferred embodiment, the first and second gripping mechanisms are pivotally supported on the carriage and each have respective gripping members movable with respect to each other between an open and a closed position. The first and second gripping mechanisms each have guide rollers rotatably supported thereon, and cam surfaces provided along the path of movement of the carriage cooperate with the guide rollers to effect opening, closing and pivotal movement of the first and second gripping mechanisms at appropriate locations along the path of movement of the carriage and in response to movement of the carriage. An advantage of an arrangement of this type is that all of the requisite movement, including movement of the carriage, swiveling movement of the first gripping mechanism, and opening and closing of both gripping mechanisms, can be effected with a single motor.

The carriage movement could be controlled in a relatively simple manner, for example by a conventional drum switch, so that it reciprocates between its end positions in a relatively continuous manner. If desired, however, movement of the carriage toward the working position can begin before machining of the workpiece at the working position is completed, the travel of the carriage being temporarily interrupted, if necessary, as it nears the working position to permit completion of the machining operation. This allows the workpiece exchange time to be minimized, particularly in the case of relatively long machining operations.

When the machine tool is a gear working machine, the blank workpiece will typically be a pretoothed gear which meshes with a gearlike cutting tool as it moves into the working position. If, instead of meshing, the teeth on the workpiece and tool engage in a tip-to-tip manner, the second gripping mechanism of the preferred embodiment shifts slightly from its normal position, thereby actuating a switch which temporarily reverses the direction of movement of the carriage so that the workpiece and tool move apart and then move back together with proper meshing of the teeth thereon.

BRIEF DESCRIPTION OF THE DRAWINGS

The invention will be described hereinafter in connection with an exemplary embodiment illustrated in FIGS. 1 to 18, in which.

DETAILED DESCRIPTION

Figure 1:
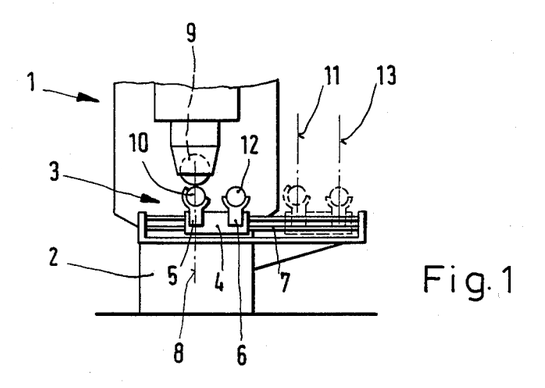
FIG. 1 is a simplified side view of a machine tool equipped with the inventive apparatus.

FIG. 1 is a very simplified illustration of a machine tool, in this case a gear shaving machine 1, on the bed 2 of which is arranged a dual loading sliding arrangement 3. First and second gripping mechanisms 5 and 6 are supported on a carriage 4 and, together with the carriage 4, are longitudinally movable along a sliding bar arrangement 7 under control of a drive mechanism which is described below. The first gripping mechanism 5 receives through this a gear or workpiece 10 (a finished part), which was machined while supported in a working position 8 by a tool (here a shaving gear 9), and moves it to an unloading position 11. The second gripping mechanism 6 moves a gear or workpiece 12 (a blank) which is to be machined from a loading position 13 to the working position 8, where it is received by a conventional support mechanism (not illustrated), for example between the tips of two tailstocks. Since the two gripping mechanisms 5 and 6 are always moved with one another, the removed finished part 10 must first be moved to the side of the working position 8 remote from the unloading position 11, namely to the left in FIG. 1. During the return of the carriage 4, the finished part 10 would collide with the clamped-in blank 12, but this is avoided by lowering it and guiding it underneath the blank 12. The mechanisms needed for this and the mechanisms for guiding a gripping member of the empty first gripping mechanism 5 under the finished part 10 during the leftward movement and for guiding the empty second gripping mechanism 6 under the blank 12 during the return movement will be described hereinafter in connection with FIGS. 2 to 6.

A support 16 is secured on the bed 2 by means of members 17. A motor 18, for example a hydraulic motor, is secured on the support 16 and carries a sprocket wheel 19 on its driven shaft. A second sprocket wheel 20 (FIGS. 2b and 5) is rotatably supported at the other end of the support 16 by means of an axle 23 and a bearing housing 21. The two sprocket wheels 19 and 20 support a roller chain 22 which, in FIGS. 2a and 2b, is indicated only as a dash-dotted line. To properly tension the chain 22, the bearing housing 21 is preferably movable and releasably securable on the support 16 with a conventional and therefore not illustrated mechanism. Both the upper and lower strands of chain 22 slide on chain guides 24 and 25 (FIG. 4) which are mounted on the support 16 by holders 26 and 27. Two guide rods 30 and 31, which form the sliding bar arrangement 7, are supported by screws and holders 32 and 33 on the support 16. The carriage 4 is slidably supported by means of bearing sleeves, such as sleeve 34, on the guide rods 30 and 31. The bearing sleeves are held in place by lids 36 and 37 (FIG. 3) which are secured to an end of the carriage 4. The carriage 4 is driven by the motor 18 by means of a member 38 thereon (FIG. 4) which engages the roller chain 22.

The first gripping mechanism 5, identified hereinafter as the finished part gripping device, and the second gripping mechanism 6, identified hereinafter as the blank gripping device, are supported on the carriage 4. The finished part gripping device 5 is supported for pivotal movement about an axle 43 and has a pin 42. It includes a first gripping member 40 and a second gripping member 41 which are respectively exchangeably secured on a first one-arm lever 44 and a second two-arm lever 45, the latter having the pivot pin 42 thereon with a bearing sleeve 46 around it. A tension spring 48 which is directed transversely to the axis 43 urges the two gripping members 40 and 41 toward one another. The spacing between the gripping members 40 and 41 in a closed position, which corresponds with a dimension of the workpiece to be received therebetween, can be adjusted by means of an adjustable stop 49. A guide roller 50 is rotatably supported on the side of the first lever 44 opposite the support 16 and a guide roller 51 is rotatably supported on the lower arm 52 of the second lever 45, which will be described later.

Figure 4:
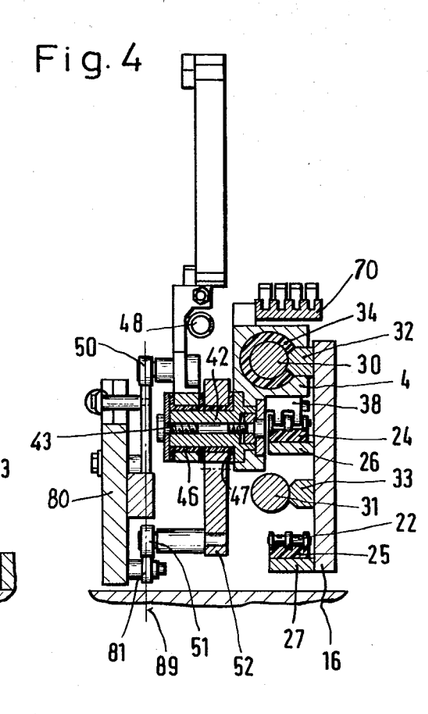
FIG. 4 is a sectional view taken along the line IV—IV of FIG. 2.
Figure 5:
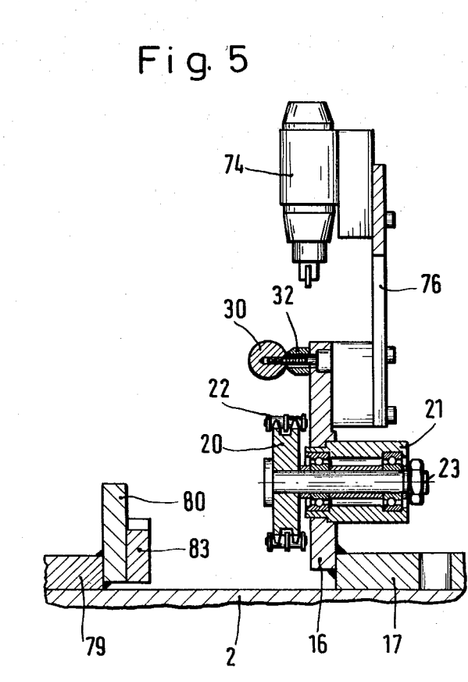
FIG. 5 is a sectional view taken along the line V—V of FIG. 2.
Figure 6:
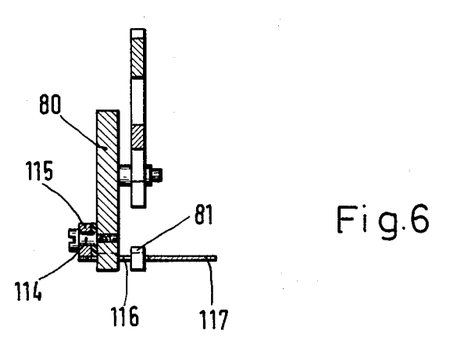
FIG. 6 is a sectional view taken along the line VI—VI of FIG. 2.

The blank gripping device 6 includes a first gripping member 56 and a second gripping member 55, which are respectively exchangeably secured on a first one-arm lever 57 and a second one-arm lever 58. The first lever 57 is supported for pivotal movement about an axle 59 (FIG. 2a) in a manner similar to the finished part gripping device 5 by bearing sleeves supported on a pin mounted in the carriage 4, and the second lever 58 is pivotally supported in the same manner on the lever 57 for movement about an axle 60 which is parallel to the axis 59. A tension spring 61 which is directed transversely to the axle 60 urges the two gripping members 55 and 56 toward one another. The spacing between the gripping members 55 and 56 in a closed position, which corresponds with the blank 12 to be received therebetween, can be adjusted by means of an adjustable stop 62. Between the carriage 4 and a downwardly directed arm 63 of the lever 57 there is provided a tension spring 64 which resists an unintended clockwise tipping of the blank gripping device 6 about the axis 59 and urges same upwardly against a stop 65 provided on the carriage 4. The optimum position of the blank gripping device 6 can be adjusted by means of an adjusting screw 66 which extends through the lever 57 and engages the stop 65. A guide roller 67 is rotatably supported on the first lever 57 and a guide roller 68 is rotatably supported on the second lever 58 on the side thereof opposite the carriage 4, which guide rollers will be discussed later on. All of the guide rollers 50, 51, 67 and 68 lie in a common vertical plane 89 (FIG. 4).

A cam support bar 70 (FIGS. 2a, 3 and 4) is secured on the upper side of the carriage 4 and has grooves which receive longitudinally adjustable cams 71, 72 and 135. These cams 71, 72 and 135 can actuate valves 73, 74 and 126 or limit switches 77, 78 and 127 which are arranged on holders 75 and 76 secured by screws on the support 16.

Parallel to the support 16 there is secured on the bed 2 by means of spaced members 79 (FIG. 5) a guide block support 80 on which, on the side facing the support 16, are mounted a guide rail 81, two stops 82 and 83, four guide blocks 84, 85, 86 and 87, and a pawl 88. The upper and/or lower surfaces of these parts serve as guide and cam surfaces which cooperate with the guide rollers 50, 51, 67 and 68 in a manner described later, and therefore all lie in the same vertical plane 89 as such rollers.

The guide rail 81 has as its upper surface a flat, horizontal first guide surface 90 which is inclined slightly (ramp 91) only at the end adjacent the sprocket wheel 20. Gaps 92 and 93, the widths of which correspond approximately to the diameter of the guide roller 51, are provided between the guide rail 81 and the stops 82 and 83, respectively. The stop 82 has a vertical surface which transfers into an inclined ramp 94 which projects over the gap 92 and slightly beyond the end of the guideway 90. The stop 83 has as its upper surface a ramp 95' which is inclined downwardly toward the gap 93.

The guide block 84 is located above the guide rail 81 and is substantially formed by a horizontal portion 95 which extends parallel to the guide rail 81 and by two legs 96 and 97 provided at the ends of the horizontal portion which are inclined upwardly, the leg 96 having a horizontal surface 98 on the end thereof, while the other leg 97 ends in a point.

The guide blocks 85 and 86 are arranged approximately in the space which is between the two legs 96 and 97, the upper surfaces 100 and 101 of which serve as guide surfaces. The guide block 85 has an approximately rectangular shape, and the upper surface 100 thereof lies at the same level as the horizontal surface 98 of the guide block 84. It is supported for pivotal upward movement about an axle 102 at its end which is adjacent the guide block 86. It is normally pulled by a spring 103 to approximately horizontal against an adjustable stop (not illustrated), and its swivelling movement is limited by a further adjustable stop 104. The guide block 86 is approximately comma-shaped and points slightly upwardly with its pointed end 105. It is supported for pivotal upward movement about an axle 106 at its end adjacent the guide block 85. It is normally pulled by a spring 107 to a roughly horizontal position against an adjustable stop (not illustrated).

The guide block 87 is arranged underneath the leg 97 and has a guide surface 109 on its underside.

The pawl 88 is supported approximately above the stop 82 for pivotal movement on an axle 110. It is normally pulled by a spring 111 to the position illustrated in FIG. 2a against an adjustable stop and has a horizontal guide surface 112 on the upper end thereof.

A two-arm lever 115 (FIGS. 2b and 6) is pivotally supported by a pin 114 on the guide block support 80. The shorter arm of lever 115 has a horizontal plate 117 supported on a web 116 which extends under the guide block carrier 80 and the guide rail 81. The longer arm of lever 115 operates, during swivelling movement of the lever 115, a member which influences operation of the drive motor 18, for example a switch 118.

Figure 2A:
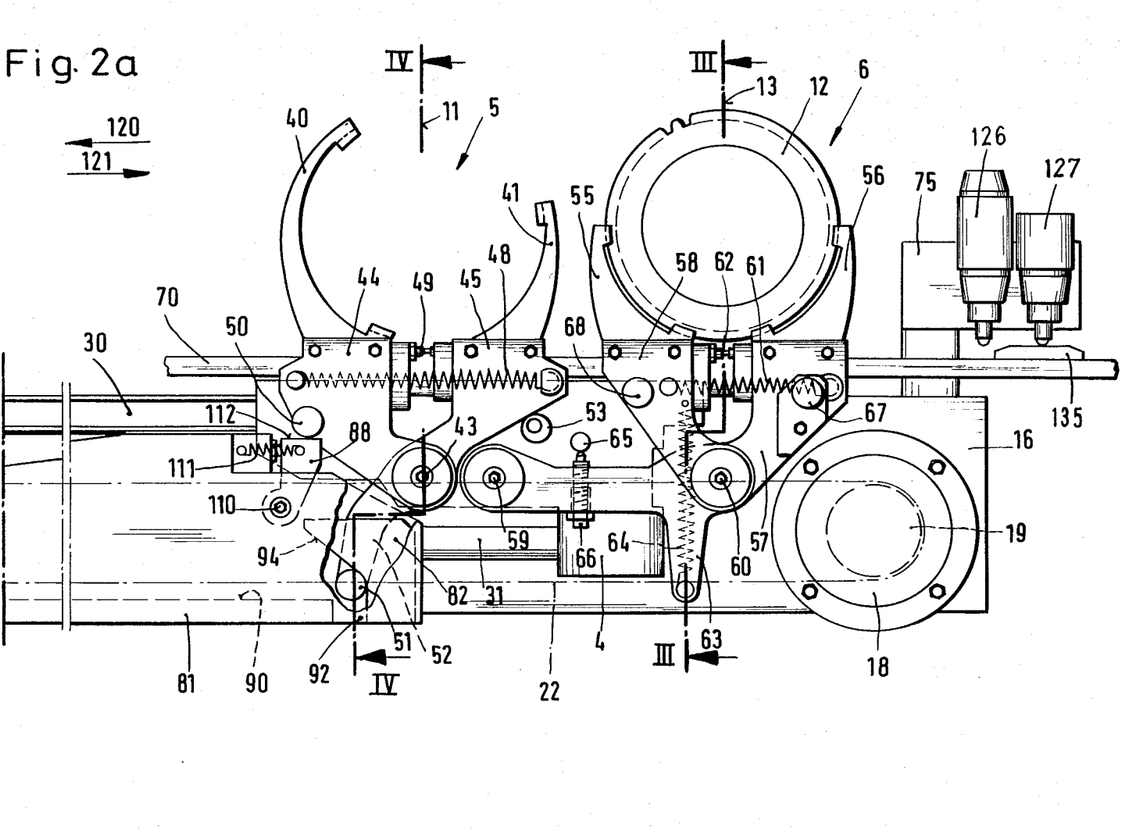
FIGS. 2a and 2b are respective portions of a side view of the inventive apparatus.
Figure 2B:
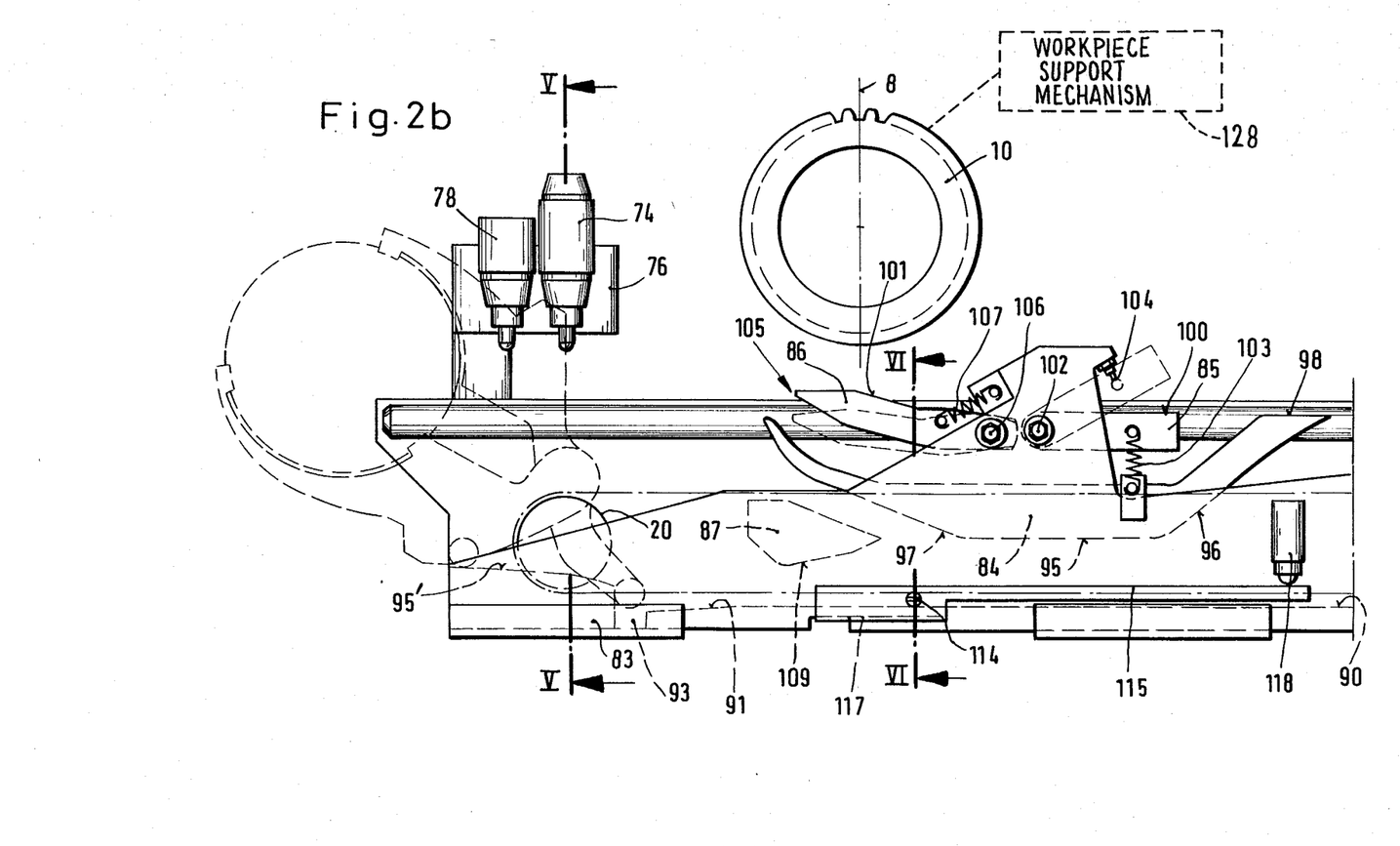
Figure 3:
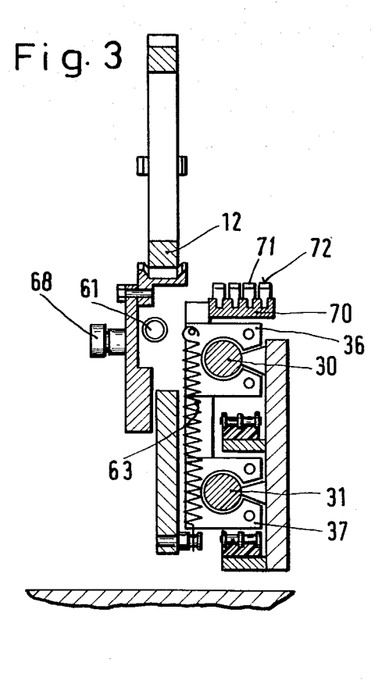
FIG. 3 is a sectional view taken along the line III—III of FIG. 2.

In its initial position, illustrated in FIGS. 2a and 2b, the carriage 4 is at the right end of its path of travel. The finished part gripping device 5 is thereby at the unloading position 11, its guide roller 50 is supported on the pawl guide surface 112, and its guide roller 51 rests against stop 82. To ensure that it cannot tip toward the blank gripping device 6, a stop 53 mounted on the carriage 4 engages the upper arm of lever 45. The stop 53 is constructed as an adjustable eccentric, so that the finished part gripping device 5 can be adjusted to the optimum orientation for the unloading position 11. The blank gripping device 6 is at the loading position 13, where it receives from above from a conventional and not illustrated transfer device a blank 12. It is held in the proper position by the spring 64 and stop 65. A workpiece 10 is supported by a conventional mechanism 128 at the working position 8 in the working space of the machine, where it is machined by the tool 9.

The sequence of a workpiece exchange is illustrated in FIGS. 7 to 17, in which only the parts which are important for this operation are illustrated, the two gripping devices 5 and 6 in particular being illustrated in a very diagrammatic manner.

Figure 18:
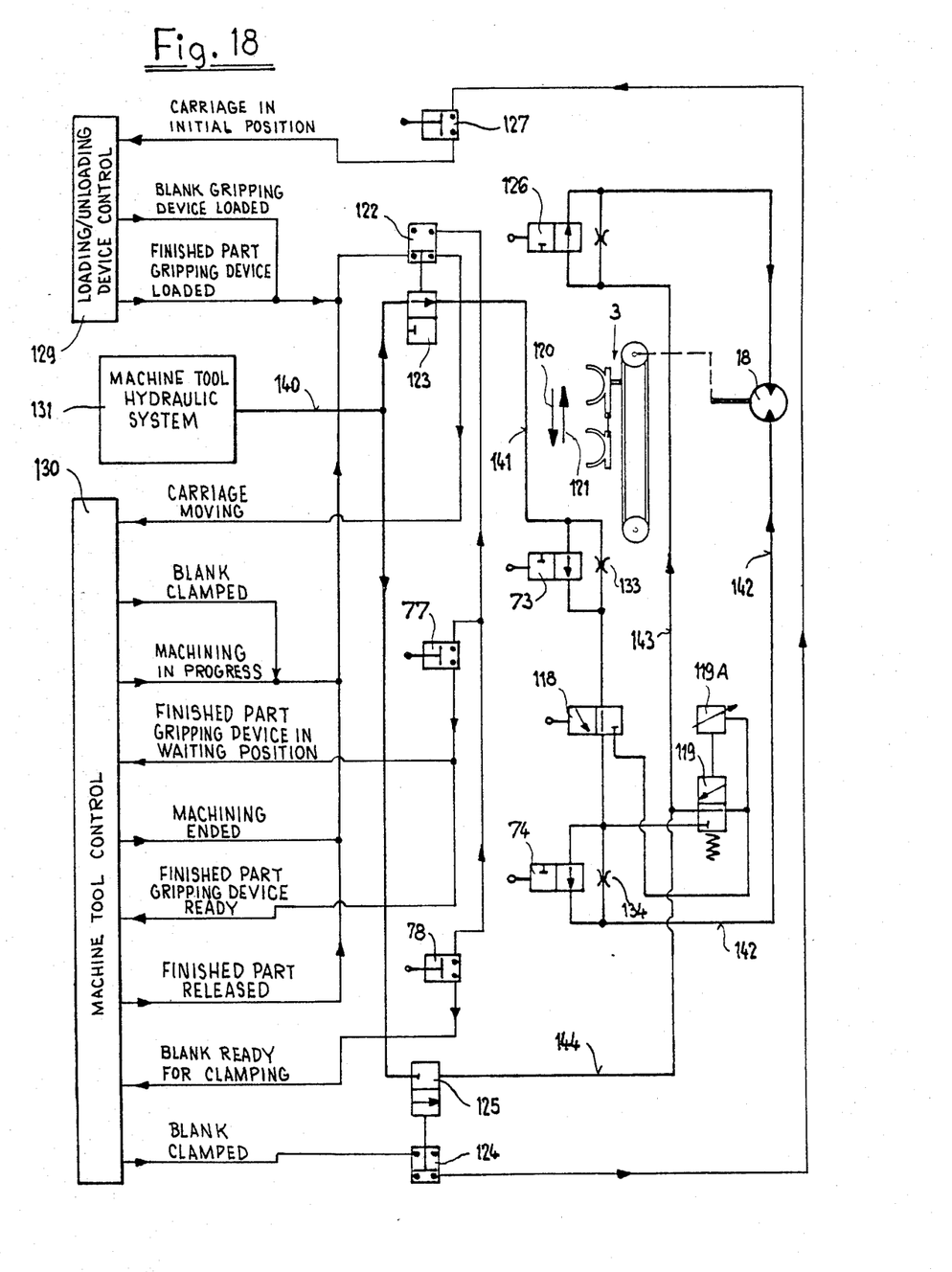
FIG. 18 is a simplified control diagram of the inventive apparatus.

The connection of the electrical switches and hydraulic valves with one another and their cooperation with a control unit 129 for the transfer device and a control unit 130 for the machine tool is illustrated in FIG. 18.

Figure 7:
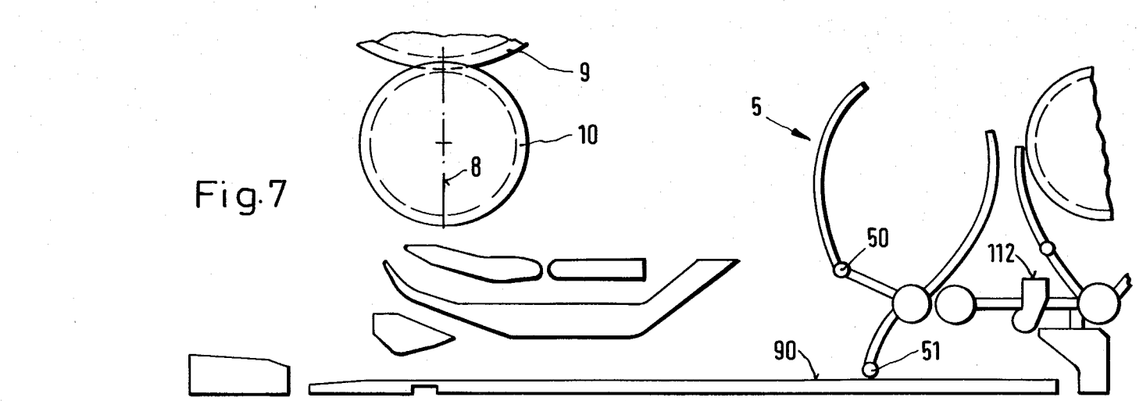
FIGS. 7 to 17 are diagrammatic views showing successive operational positions of the apparatus of FIGS. 2a and 2b.

As soon as the blank gripping device 6 is loaded with a blank 12 and the finished part gripping device 5 is unloaded, the control unit 129 for the transfer device transmits the signals "blank gripping device is loaded" and "finished part gripping device is unloaded" to a switch 122, which opens a blocking valve 123 and thus, through lines 140, 141, 142, creates a connection between the hydraulic system 131 of the machine tool and the hydraulic motor 18. At this point in time, a machining operation may have just ended in the machine tool, or may still be occurring. The latter will be the situation particularly in the case of long machining operations, and FIG. 18 is adapted to handle this. Thus, when the hydraulic motor 18 is supplied with oil by the hydraulic system 131, it moves the carriage 4 by means of the chain 22 in a feed movement in the direction of arrow 120 toward the working position 8. The movement of the switch 122 also gives the signal "carriage moving" to the control unit 130 for the machine tool, and the control unit 130 then gives the signals "blank is clamped" and "machining in progress" to the switch 122. With this, the switch remains, like the valve 123, in the earlier assumed position. As shown in FIG. 7, once the guide roller 50 leaves the guide surface 112, the guide roller 51 takes over the support of the finished part gripping device 5 through engagement with guide surface 90.

Figure 8:
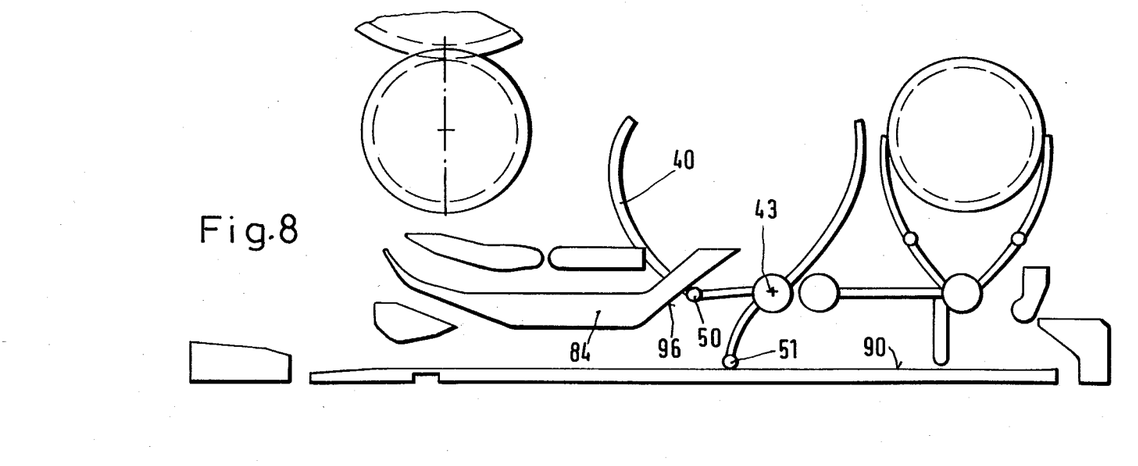
Figure 9:
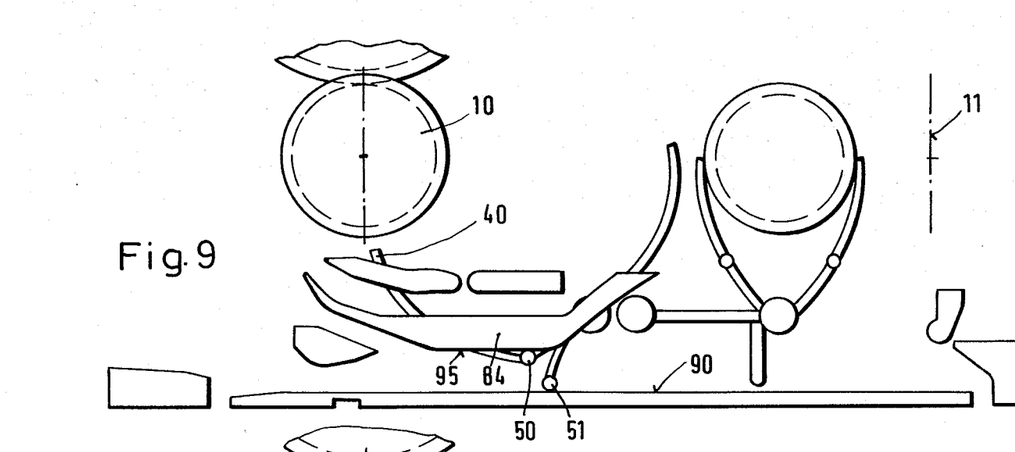
Figure 10:
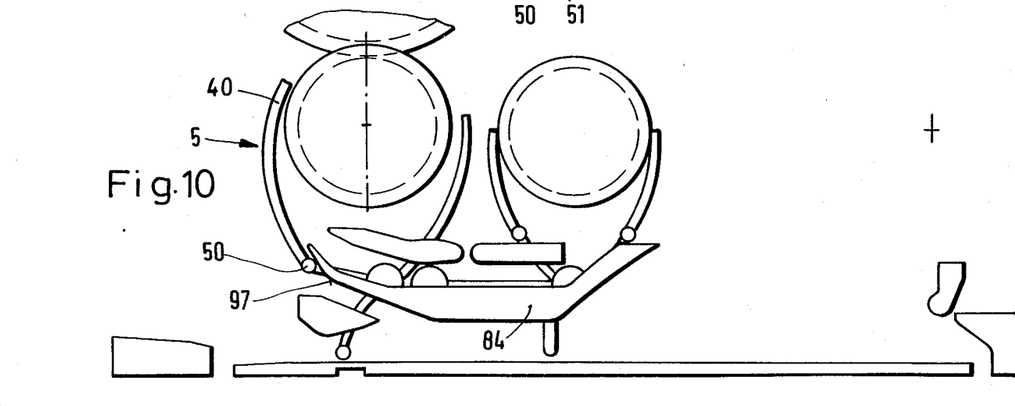

When the guide roller 50 engages the leg 96 of the guide block 84, it is moved downwardly against the urging spring 48 as the feed movement continues, and in this manner the gripping member 40 is moved in a direction which opens the finished part gripping device 5 (see FIG. 8). The guide roller 51 still rests on the guide surface 90 and prevents the finished part gripping device 5 from pivoting about the axle 43.

During the further course of the feed movement, the guide roller 50 engages the underside of the horizontal portion 95 of the sliding block 84 and the gripping member 40 is thus guided under the workpiece 10. When the guide roller 50 thereafter moves upwardly along the leg 97 of the guide block 84 (FIG. 10), gripping member 40 is moved in a direction which closes the finished part gripping device 5. The continuous engagement of the guide roller 50 with the underside of the leg 97 and the closing movement are effected by the spring 48.

If the machining process is not yet finished, the feed movement is stopped prior to completion of the closing operation. For this purpose, a valve 73, which is not illustrated in FIGS. 2a and 2b for the purpose of better clarity, is operated by the cam 71 which is mounted on the cam support bar 70, which causes the oil flow in the line 141 to be interrupted in the valve and to be guided through a constriction 133. The thus achieved throttling of the oil flow effects a reduction in the speed of the hydraulic motor 18 and thus stops the carriage 4, whereby the stopping of the feed movement and thus of the closing operation, when the cam 71 operates a switch 77 after operating the valve 73, does not occur suddenly. The switch 77 effects a switching of the switch 122 and thus of the valve 123 into a blocking position in which the oil flow to the hydraulic motor 18 is interrupted. The operation of the switch 77 at the same time transmits the signal "finished part gripping device in waiting position" to the control unit 130 for the machine tool.

As soon as the machining operation has ended, the control 130 gives the signal "machining ended" to the switch 122, which then assumes again its earlier position and switches the valve 123 so that oil again flows from the line 140 through the line 141, the throttle 133 and the line 142 to the hydraulic motor 18. At the end of the closing operation, or directly before it ends, the feed movement is again stopped, namely by a further cam which operates the switch 77 or by the earlier mentioned cam 71, which operates a further and not illustrated switch which corresponds with the switch 77 in its design. With this, the message "finished part gripping device ready for loading" is provided to the control unit 130 for the machine tool. The control unit 130 causes the clamping mechanism 128 to release the workpiece or finished part 10 which it is supporting. Thereafter, it gives the signal "finished part released" to the switch 122, which again switches the valve 123.

The flowing oil stream again effects further feed movement. The cam 71 thereby again frees the tappet of the valve 73 so that the constriction 133 is again without effect. During this further feed movement, the guide roller 51 moves onto the ramp 91.

Figures 11, 12:
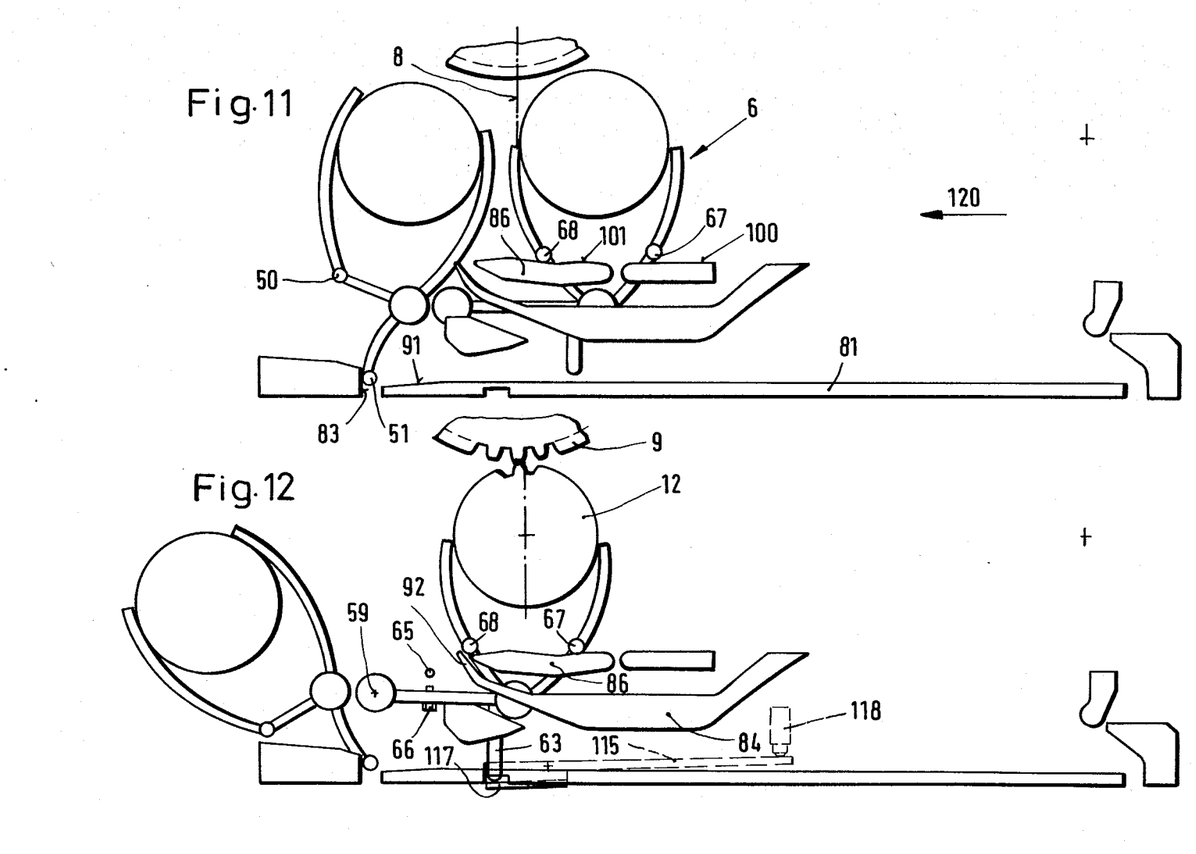

Guide roller 51 then moves along ramp 91 of the guide rail and finally engages the stop 83, which causes a tipping movement of the entire finished part gripping device to begin because the guide roller 50 is no longer supported on a surface (see FIG. 11).

The blank gripping device 6 has, in the meantime, arrived near the working position 8. Its guide rollers 67 and 68 engage the guide surfaces 100 and 101, and the guide roller 68 presses the guide block 86 slightly downwardly (see FIG. 11). During further feed movement, it may happen that the blank 12 and the tool 9, instead of reaching the working position with their teeth meshed, reach the tooth-on-tooth position shown in FIG. 12 in which the tool 9 obstructs further feed movement and thus the reaching of the working position. The guide block 86, however, which both guide rollers 67 and 68 now engage, swings farther downwardly under the force which acts onto it and permits swivelling of the blank gripping device 6 about the axis 59, the adjusting screw 66 moving away from the stop 65. The tip of arm 63 then presses the plate 117 downwardly, which results in an upward swinging of the long arm of the lever 115, which in turn operates the switch 118.

This valve 118 now obstructs the line 142 and guides the oil stream through a further valve 119 and a line 143 to the hydraulic motor 18, which then rotates in the opposite direction and thus effects a reversal of the feed direction until the blank part 12 and the tool 9 are separated from one another. An adjustable time element 119A then causes a switching of the valve 119. The oil now flows again through the line 142 to the hydraulic motor 18 and the feed movement again occurs in the original direction 120. When the valve 118 is no longer operated, the valve 119 returns to its original position. The contact between the blank 12 and tool 9 will normally result in a small rotation of at least one of these two parts so that, during the second approach to the working position 8, an orderly tooth meshing between the blank 12 and tool 9 is normally achieved. If necessary, the movement reversal is repeated in a similar manner. As the tool 9 presses on the blank 12 during the tooth-on-tooth engagement, the guide roller 68 engages the leg 97 of the guide block 84. With this, an undesired opening of the blank gripping device 6 is prevented.

Figure 13:
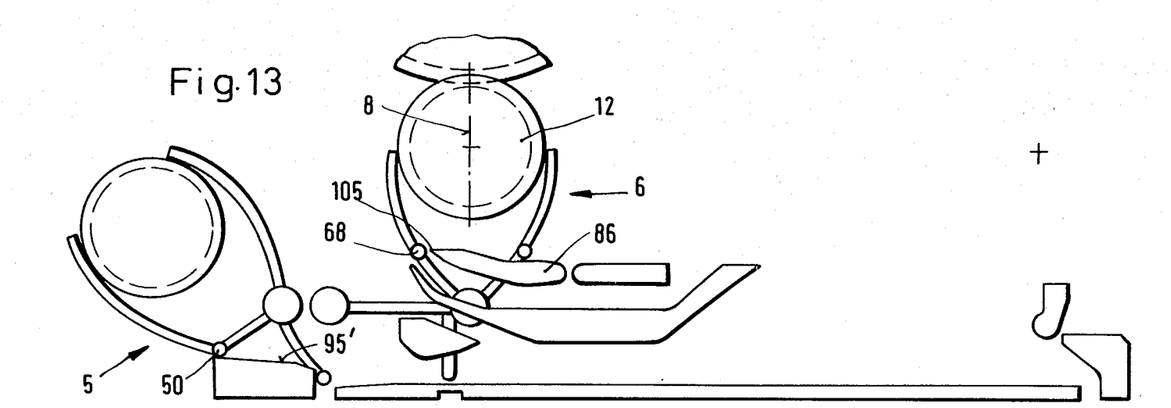
Figure 14:
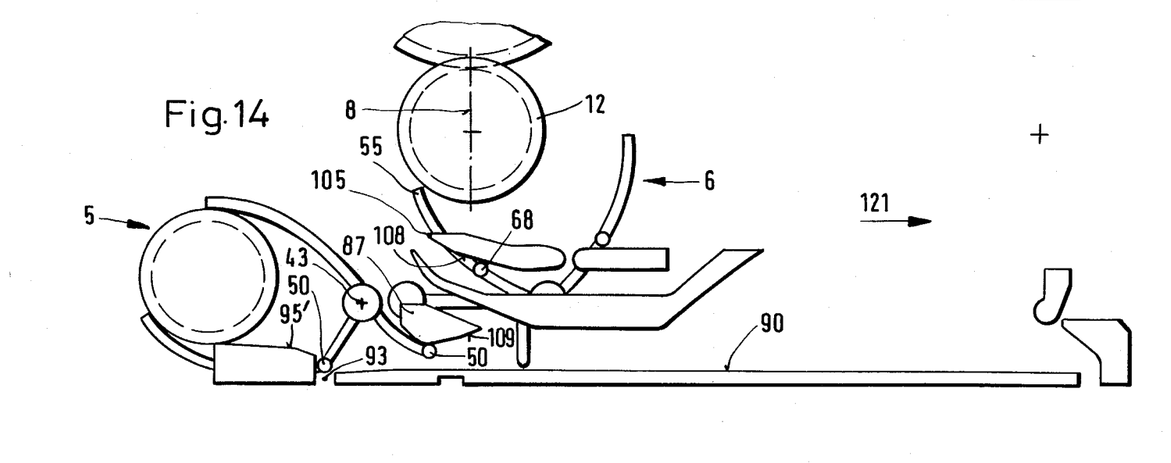

Before the blank part 12 reaches the working position 8, the cam 72 operates the valve 74, which causes the oil flow to the line 142 through this valve to be interrupted and to be guided through a constriction 134. With this, a reduction of the feed speed is effected before the cam 72 operates switch 78 which, in the same manner described earlier for the switch 77, stops the feed movement. At the same time, the signal "blank ready for clamping" is transmitted to the control unit 130 of the machine tool. The guide roller 68 is now directly adjacent the tip 105 of the guide block 86 which, under the action of the spring 107, has again assumed its normal position (FIG. 13). The finished part gripping device 5 has in the meantime continued its swivelling movement, the guide roller 50 now resting on the ramp 95'.

The control unit 130 now causes the clamping mechanism 128 to accept the blank part 12. It thereafter gives the signal "blank clamped" to the switch 124, which switches a valve 125. With this, a line 144 which had been obstructed is opened and oil flows to the hydraulic motor 18 through lines 144, 143. A return movement of the carriage 4 in the direction of arrow 121 now occurs. Based on their construction and arrangement, valves 73, 74 and switches 77, 78 are without function during this return movement. The guide roller 68 of the blank gripping device 6 is deflected downwardly by the tip 105 and moves along a cam surface 108 which is formed on a guide block 86, thus moving the gripping member 55 in a direction which opens the gripping device 6. The gripping member 55 is thus guided under the blank 12, which is now supported at the working position 8 (see FIG. 14). The finished part gripping device 5 has, in the meantime, reached a position where the guide roller 50 has left ramp 95'. In order to prevent it from slipping into the gap 93 and causing the gripping device 5 to carry out an uncontrolled swivelling movement about the axle 43, the guide block 87 is provided with a guide surface which the guide roller 51 engages until the guide roller 50 has reached the guide surface 90.

Figure 15:
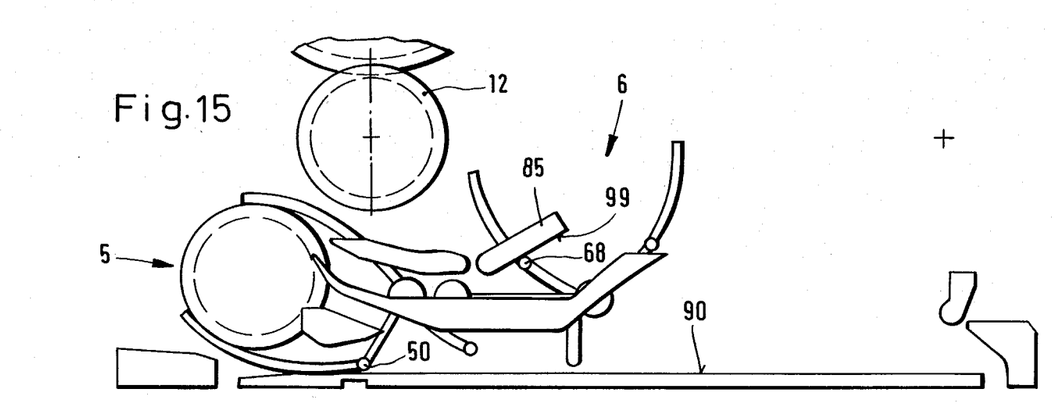
Figure 16:
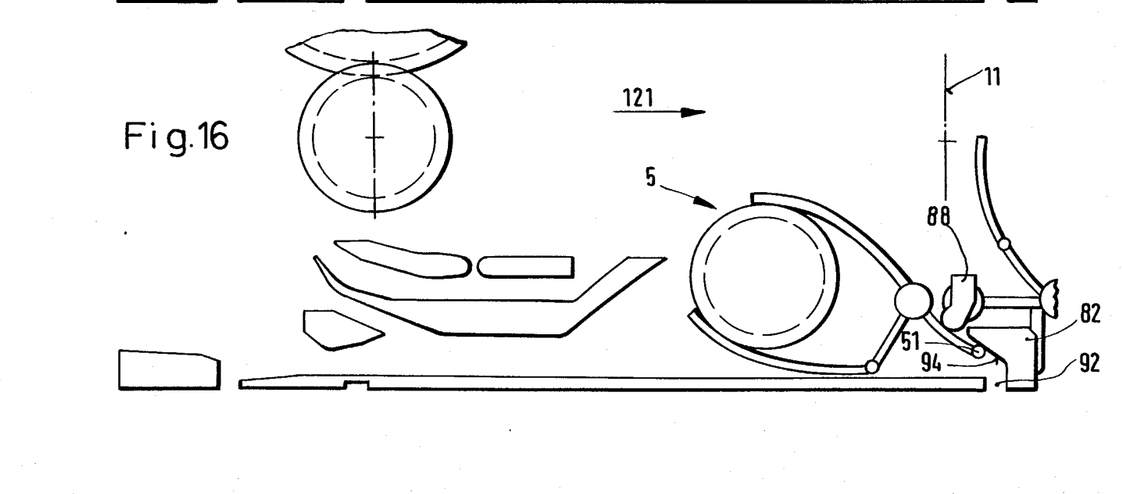

During the further course of the return movement, the guide roller 68, under the action of the spring 61, urges the guide block 85 upwardly against the lesser force of the spring 103 as it follows the surface 99 and in this manner permits a smooth closing of the blank gripping device 6 (see FIG. 15). The guide roller 50 on the finished part gripping device 5 rests on the guide surface 90 and is in this manner guided under the blank 12.

Figure 17:
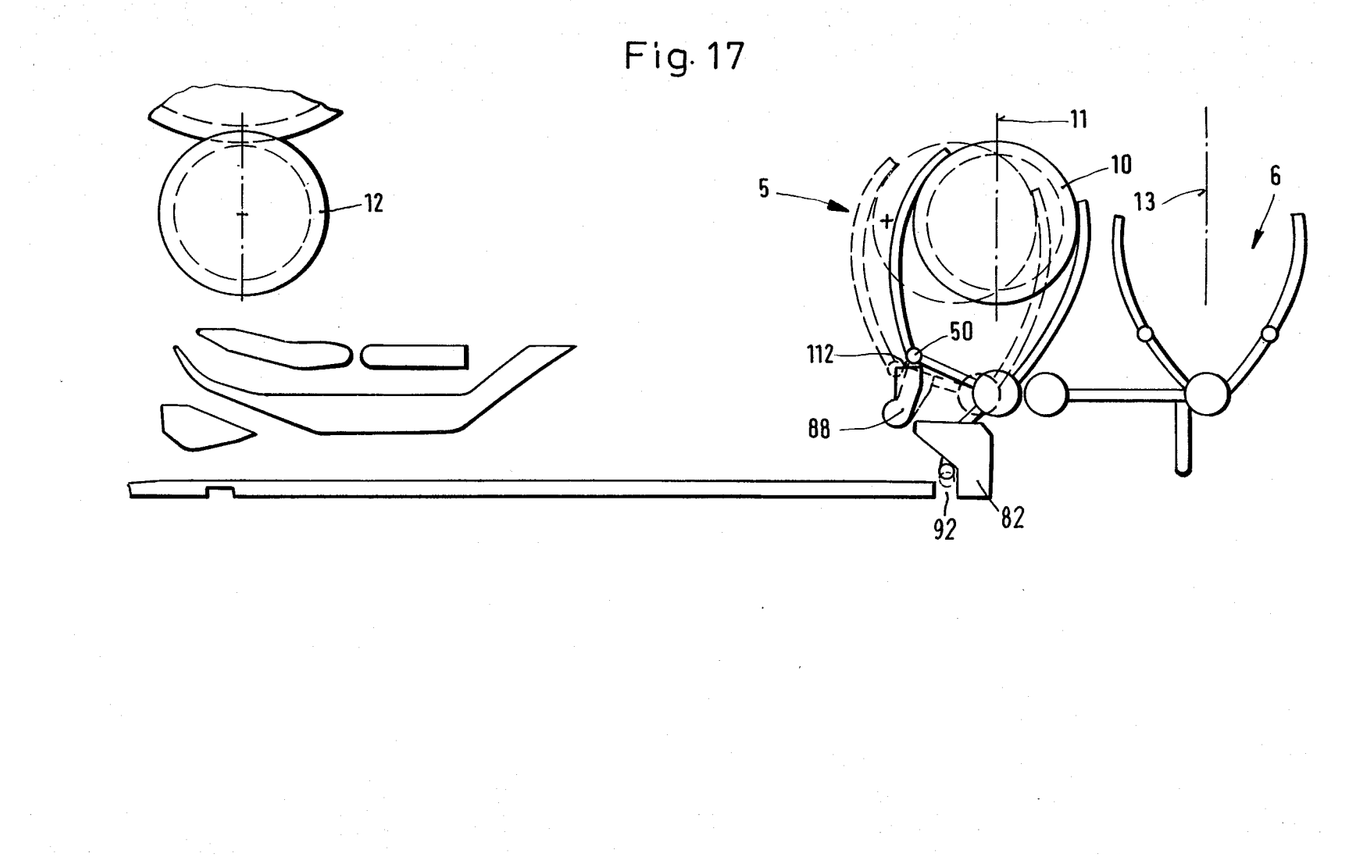

The return movement in the direction of arrow 121 is continued with a closed blank gripping device 6. When the guide roller 51 on the device 5 reaches the ramp 94 on stop 82 (FIG. 16), erecting of the finished part gripping device 5 begins. The roller 51 moves downwardly along the ramp 94 and into the gap 92. With the approach of the carriage 4 to its initial position, the finished part gripping device 5 is thus increasingly erected, and the roller 51 ultimately leaves the gap 92 but continues to rest on the stop 82. Finally, the guide roller 50 moves the pawl 88 clockwise against the force of its spring 111 (FIG. 17). Directly thereafter the erecting of the finished part gripping device 5 is completed and the pawl snaps back to its normal position, so that the roller 50 again rests on the support surface 112 and the carriage 4 is again in its initial position.

The cam 135 previously operated the valve 126, through which the oil flow in the line 143 is interrupted in the valve and is guided through a contriction 136. Through this, a reduction of the return speed is effected prior to the cam 135 operating the switch 127. This switch causes the switch 124 to again switch the valve 125, so that the oil flow is switched off and the return movement is thus stopped. Transmitted at the same time to the control unit 129 for the transfer device is the message "carriage in initial position".

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method for effecting an automatic workpiece exchange on a machine tool, comprising the steps of supporting a carriage for rectilinear feed and return movements between an initial position and a position in a machining region of the machine tool; supporting first and second gripping mechanisms on said carriage which each have gripping members movable relative to one another between gripping and release positions, which are supported for pivotal movement with respect to one another on said carriage at locations spaced in a direction of movement of said carriage, and which are respectively moved from unloading and loading positions to said machining region of the machine tool during said feed movement of said carriage and are returned to said unloading and loading positions during said return movement; supporting cam follower means on said first and second gripping mechanisms; providing cam means along the path of movement of said gripping mechanisms; moving said carriage from said initial position to said machining region, said cam means cooperating with said cam followers on said first and second gripping mechanisms for causing the initially empty first gripping mechanism, during said feed movement of said carriage, to move to its gripping position as it moves through said machining region so as to grip and remove a machined workpiece from a workpiece support mechanism in said machining region of the machine tool and for causing said second gripping mechanism, which is initially loaded with a blank workpiece, to grip the blank workpiece during said feed movement of said carriage and to transport it from said loading position to said machining region of the machine tool, and to thereafter be moved to its release position and to deliver the blank workpiece to said workpiece support mechanism; and thereafter moving said carriage from said machining region back to said initial position, said cam means cooperating with said cam followers on said first gripping mechanism for causing said first gripping mechanism to be pivoted relative to said second gripping mechanism and to pass under said workpiece support mechanism as it transports the machined workpiece to said unloading position.

2. The method according to claim 1, wherein said step of supporting said cam follower means on said first and second gripping mechanisms includes the step of supporting guide rollers on said first and second gripping mechanisms, and wherein said step of providing said cam means along the path of movement of said first and second gripping mechanisms includes the step of providing guide blocks along the path of movement of said gripping mechanisms which have guide surfaces which, during said steps of moving said carriage, cooperate with said guide rollers on said gripping mechanisms to effect said relative pivotal movement of said gripping mechanisms and to effect said movement of said gripping members thereof between said gripping and release positions.

3. The method according to claim 2, including the step of supporting said gripping members of each said gripping mechanism to move pivotally relative to each other, said pivotal movement of said gripping members and said relative pivotal movement of said gripping mechanisms occurring about respective axes which are normal to a plane which extends parallel to the directions of movement of said carriage.

4. The method according to claim 1, including the steps of: unloading a machined workpiece from said first gripping mechanism at said unloading position and loading a blank workpiece in said second gripping mechanism at said loading position when said carriage is in its initial position, and simultaneously causing the machine tool to machine a workpiece supported on said workpiece support mechanism; thereafter causing said carriage to carry out said feed movement, said cam means causing one said gripping member of said first gripping mechanism which is nearest said workpiece support mechanism to be moved generally downwardly in a direction corresponding to movement of said first gripping mechanism to its release position, so that it travels under the machined workpiece which is supported on said workpiece support mechanism, and to then move in the opposite direction so as to move said first gripping mechanism toward its gripping position; interrupting said feed movement when the other gripping member of said first gripping mechanism has reached the machined workpiece and as said first gripping mechanism reaches its gripping position; thereafter causing said workpiece support mechanism to release the machined workpiece; thereafter continuing said feed movement of said carriage, the machined workpiece being moved away from said workpiece support mechanism and said cam means causing said first gripping mechanism to be pivoted generally downwardly in a direction away from said workpiece support mechanism; stopping said feed movement when said second gripping mechanism reaches said workpiece support mechanism and then causing said workpiece support mechanism to grip the blank workpiece held by said second gripping mechanism; thereafter causing said carriage to carry out said return movement to its initial position, said cam means causing one said gripping member of said second gripping mechanism which is nearest said first gripping mechanism to be moved in a generally downward direction which corresponds to movement of said second gripping mechanism to its release position, so that it travels under said blank workpiece and said workpiece support mechanism, and to then move in the opposite direction so that said second gripping mechanism moves to its gripping position; causing said first gripping mechanism and the machined workpiece which it holds, after passing under the blank workpiece and said workpiece support mechanism, to be pivoted by said cam means back into its original position relative to said second gripping mechanism; and thereafter stopping said return movement of said carriage when said carriage reaches its initial position.

5. The method according to claim 4, including the step of initiating said feed movement of said carriage during the machining of a workpiece supported on said workpiece support mechanism; and including the step, after said one gripping member of said first gripping mechanism has passed below said workpiece support mechanism, of interrupting said feed movement until the machining of the workpiece on said workpiece support mechanism is finished.

6. An apparatus for effecting an automatic workpiece exchange on a machine tool, comprising: a carriage supported for rectilinear feed and return movements between an initial position and a position in a machining region of the machine tool; drive means for effecting movement of said carriage; first and second gripping mechanisms which are provided on said carriage and each have gripping members movable relative to one another between gripping and release positions, said first gripping mechanism being supported on said carriage for pivotal movement relative to and being spaced in a direction of movement of said carriage from said second gripping mechanism, said first and second gripping mechanisms respectively being moved from unloading and loading positions to said machining region of the machine tool in response to said feed movement of said carriage from said initial position to said position in said machining region of said machine tool; cam followers provided on said first and second gripping mechanisms; and cam means provided along the path of movement of said gripping mechanisms and cooperable with said cam followers for causing said first gripping mechanism, during said feed movement of said carriage, to move from its release position to its gripping position as it passes through said machining region so as to grip and remove a machined workpiece from a workpiece support mechanism in said machining region of the machine tool and, during said return movement of said carriage, to be pivoted relative to said second gripping mechanism and to pass under said workpiece support mechanism as it transports the machined workpiece to said unloading position, and for causing said second gripping mechanism, which is initially loaded with a blank workpiece, to grip the blank workpiece during said feed movement of said carriage and transport it from said loading position to said workpiece support mechanism in said machining region of the machine tool, and to thereafter be moved to its release position and to deliver the blank workpiece to said workpiece support mechanism.

7. The apparatus according to claim 6, wherein said carriage is movably supported on elongate longitudinal guide means which extends from said loading and unloading positions to said machining region of the machine tool; wherein said drive means includes a chain which is movably supported on said guide means, is operatively coupled to said carriage, and is driven by a drive motor; wherein said first gripping mechanism is supported for pivotal movement about an axis which extends transversely to said longitudinal guide means; wherein said first and second gripping mechanisms each have two said gripping members which can be moved relative to each other and are yieldably urged by resilient means toward said gripping position; wherein said cam followers are guide rollers rotatably supported on said first and second gripping mechanisms; wherein said cam means includes first guide block means which, during said feed movement of said carriage, cooperates with a first said guide roller supported on said first gripping mechanism and effects movement of said gripping members thereof to said release position against the urging of the associated resilient means and then permits the resilient means to return them to their gripping position; wherein said cam means includes first guide surface means which, during said feed and return movements of the carriage, effects said pivotal movement of said first gripping mechanism through engagement with a second said guide roller which is provided on a lever arm of said first gripping mechanism; wherein said cam means includes second guide surface means which, during said feed movement of said carriage, engages third and fourth said guide rollers which are respectively provided on one said gripping member and on the other said gripping member of said second gripping mechanism; and wherein said cam means includes third guide surface means which cooperates during said return movement of said carriage with said third guide roller to effect movement of said gripping members of said second gripping mechanism toward said release position against the urging of the associated resilient means and to permit the resilient means to then return them to their gripping position.

8. The apparatus according to claim 7, wherein the blank workpiece carried by said second gripping mechanism during said feed movement is a pretoothed gear which, when thereafter supported on said workpiece support mechanism, meshes with a gearlike tool; and wherein said second gripping mechanism is supported for pivotal movement about an axis disposed on a side of an axis of rotation of its movable gripping members remote from a workpiece gripped therein and, when a workpiece gripped therein engages said tool tooth tip to tooth tip, pivots downwardly against the force of a spring which is operatively coupled to said carriage and said second gripping mechanism, deflects a movably supported part of said second guide block means, and causes a mechanism which controls said drive motor to first reverse the direction of movement of said carriage, and then to again reverse such direction of movement to cause said carriage to resume said feed movement toward said tool.

9. The apparatus according to claim 7, wherein said first guide roller is provided on one said gripping member of said first gripping mechanism; and wherein said first gripping mechanism is, in said unloading position, supported by the other gripping member thereof engaging a stop which is provided on said carriage, and by said first guide roller on said one gripping member thereof engaging a movably supported pawl which is biased toward an initial position by a spring and is moved away from said initial position by said second guide roller against the force of said spring during said return movement, and which, when said first gripping mechanism has reached said unloading position, is moved by the associated spring to a position under said first guide roller.

10. The apparatus according to claim 7, wherein said first gripping mechanism is, in said unloading position, supported by said other gripping member thereof engaging a stop which is provided on said carriage, and by said first guide roller on said one gripping member thereof engaging a movably supported pawl which is biased toward an initial position by a spring and is moved away from said initial position by said second guide roller against the force of said spring during said return movement, and which, when said first gripping mechanism has reached said unloading position, is moved by the associated spring to a position under said first guide roller.

11. The apparatus according to claim 7, wherein said first gripping mechanism, during said feed movement of said carriage, is supported by one of engagement of said other gripping member thereof with stop means provided on said carriage and engagement of said second guide roller with said first guide surface means.

12. The apparatus according to claim 10, wherein said stop which is provided on said carriage is an adjustable eccentric.

13. The apparatus according to claim 7, wherein said third guide surface means includes a section provided on a member which is urged toward an initial position by a spring, which can be moved away from its initial position by said third guide roller during said return movement of said carriage against the urging of the spring, and which causes said second gripping mechanism to move toward its gripping position.

14. The apparatus according to claim 7, wherein a cam support member having adjustable cams thereon is provided on said carriage, said cams, during said feed and return movements of said carriage, actuating control mechanisms which are arranged on a stationary support and which influence at least one of the speed and direction of said feed movement.

* * * * *

UNITED STATES PATENT AND TRADEMARK OFFICE
CERTIFICATE OF CORRECTION

PATENT NO. : 4 519 733
DATED : May 28, 1985
INVENTOR(S) : Hans GREGG

It is certified that error appears in the above-identified patent and that said Letters Patent is hereby corrected as shown below:

Column 12, lines 52-64; cancel Claim 10 and replace with ---
     10. The apparatus according to Claim 7, wherein between said first guide surface means and each of two stops at the ends thereof there is provided a gap having a width which corresponds approximately to the diameter of said second guide roller of said first gripping mechanism.---

Signed and Sealed this

Fourth Day of February 1986

[SEAL]

Attest:

DONALD J. QUIGG

Attesting Officer

Commissioner of Patents and Trademarks